United States Patent
Lee et al.

(10) Patent No.: US 8,226,736 B2
(45) Date of Patent: Jul. 24, 2012

(54) FUEL PROCESSOR HAVING DESULFURIZER WITH SULFER SENSOR, FUEL CELL SYSTEM INCLUDING THE FUEL PROCESSOR, AND METHOD OF OPERATING THE FUEL CELL SYSTEM

(75) Inventors: Hyun-chul Lee, Yongin-si (KR);
Soon-ho Kim, Yongin-si (KR);
Doo-hwan Lee, Yongin-si (KR);
Do-young Seung, Yongin-si (KR);
Kang-hee Lee, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1170 days.

(21) Appl. No.: 11/675,339

(22) Filed: Feb. 15, 2007

(65) Prior Publication Data
US 2008/0038603 A1 Feb. 14, 2008

(30) Foreign Application Priority Data
Aug. 11, 2006 (KR) .................. 10-2006-0076371

(51) Int. Cl.
*B01J 7/00* (2006.01)
*C01B 3/36* (2006.01)
*G01N 5/02* (2006.01)
*G01R 27/08* (2006.01)

(52) U.S. Cl. ............... 48/61; 48/197 R; 73/73; 324/693

(58) Field of Classification Search .......... 48/61, 197 R; 423/648.1; 73/73; 324/693
See application file for complete search history.

(56) References Cited

U.S. PATENT DOCUMENTS

| 6,309,768 | B1 | 10/2001 | Patterson, Jr. et al. |
| 6,755,015 | B1* | 6/2004 | Manaka .................... 60/297 |
| 2002/0079236 | A1* | 6/2002 | Hurland et al. ............ 205/786.5 |
| 2002/0136936 | A1 | 9/2002 | Grieve et al. |
| 2003/0010020 | A1* | 1/2003 | Taga et al. ................ 60/285 |
| 2003/0017374 | A1 | 1/2003 | Edlund et al. |
| 2004/0035055 | A1* | 2/2004 | Zhu et al. ................. 48/127.9 |
| 2005/0092688 | A1* | 5/2005 | Rabellino .................. 210/668 |

FOREIGN PATENT DOCUMENTS

| JP | 4-196061 | 7/1992 |
| JP | 09-070519 | 3/1997 |
| JP | 2000-233901 | 8/2000 |
| JP | 2001-210349 | 8/2001 |
| JP | 2002-293510 | 10/2002 |

(Continued)

OTHER PUBLICATIONS

Machine Translation of JP2004-178975A (Sep. 2011).*

(Continued)

*Primary Examiner* — Matthew Merkling
(74) *Attorney, Agent, or Firm* — Lee & Morse, P.C.

(57) ABSTRACT

A fuel processor and a fuel cell system which have a desulfurizer with multiple sensors, and a method of measuring an adsorbent state in of an adsorbent the desulfurizer. The desulfurizer determines the saturation state of the adsorbent using a signal difference between at least two sensors installed adjacent to an inlet and an outlet of the desulfurizer. The desulfurizer provides an accurate determination of the saturation of the adsorbent, and can be used to determine when the adsorbent should be changed. Two desulfurizers can be alternatively used to allow for a consistent fuel flow.

20 Claims, 10 Drawing Sheets

FOREIGN PATENT DOCUMENTS

| | | |
|---|---|---|
| JP | 2003-086210 | 3/2003 |
| JP | 2003-215082 | 7/2003 |
| JP | 2003-300703 | 10/2003 |
| JP | 2004-178975 | 6/2004 |
| JP | 2004-185941 | 7/2004 |
| JP | 2004-323353 | 11/2004 |
| JP | P2005-43186 A | 2/2005 |
| JP | 2005-170741 | 6/2005 |
| JP | 2005-353497 | 12/2005 |
| JP | P2006-202564 A | 8/2006 |
| KR | 2003-48109 | 6/2003 |

OTHER PUBLICATIONS

Office Action issued in corresponding Korean Patent Application No. 2006-0076371 dated Aug. 28, 2007.
Office Action issued by Chinese Patent Office in Chinese Patent Application No. 2007100052326 on Oct. 17, 2008.
Chinese Certificate of Patent No. ZL 2007 1 0005229, issued in the corresponding Chinese application on Sep. 23, 2009 (including a copy of the Chinese application CN 100544103C).
Chinese Office Action dated Nov. 28, 2008, issued in Chinese Patent Application No. 2007100052294.
Korean Office Action dated Aug. 28, 2007, issued in Korean Patent Application No. 10-2006-0077780.
U.S. Appl. No. 11/740,535, filed Apr. 26, 2007, Hyun-chul Lee et al., Samsung SDI Co., Ltd.
Certificate of Patent No. 200710005232.6 issued by the Chinese Intellectual Property Office for a corresponding Chinese application.
Office Action issued by the Japanese Patent Office on Jun. 29, 2010.
Korean Office Action dated Feb. 22, 2008.

\* cited by examiner

FUEL PROCESSOR HAVING DESULFURIZER WITH SULFER SENSOR, FUEL CELL SYSTEM INCLUDING THE FUEL PROCESSOR, AND METHOD OF OPERATING THE FUEL CELL SYSTEM

CROSS-REFERENCE TO RELATED APPLICATIONS

This application claims the benefit of Korean Application No. 2006-76371, filed on Aug. 11, 2006, in the Korean Intellectual Property Office, the disclosure of which is incorporated herein by reference.

BACKGROUND OF THE INVENTION

1. Field of the Invention

Aspects of the present invention relate to a fuel processor that reforms a fuel source suitable for supply to a fuel cell stack, and more particularly, to a fuel processor having an improved method of measuring the state of an adsorbent in a desulfurizer, a fuel cell system including the fuel processor, and a method of operating the fuel cell system.

2. Description of the Related Art

Figure 1:
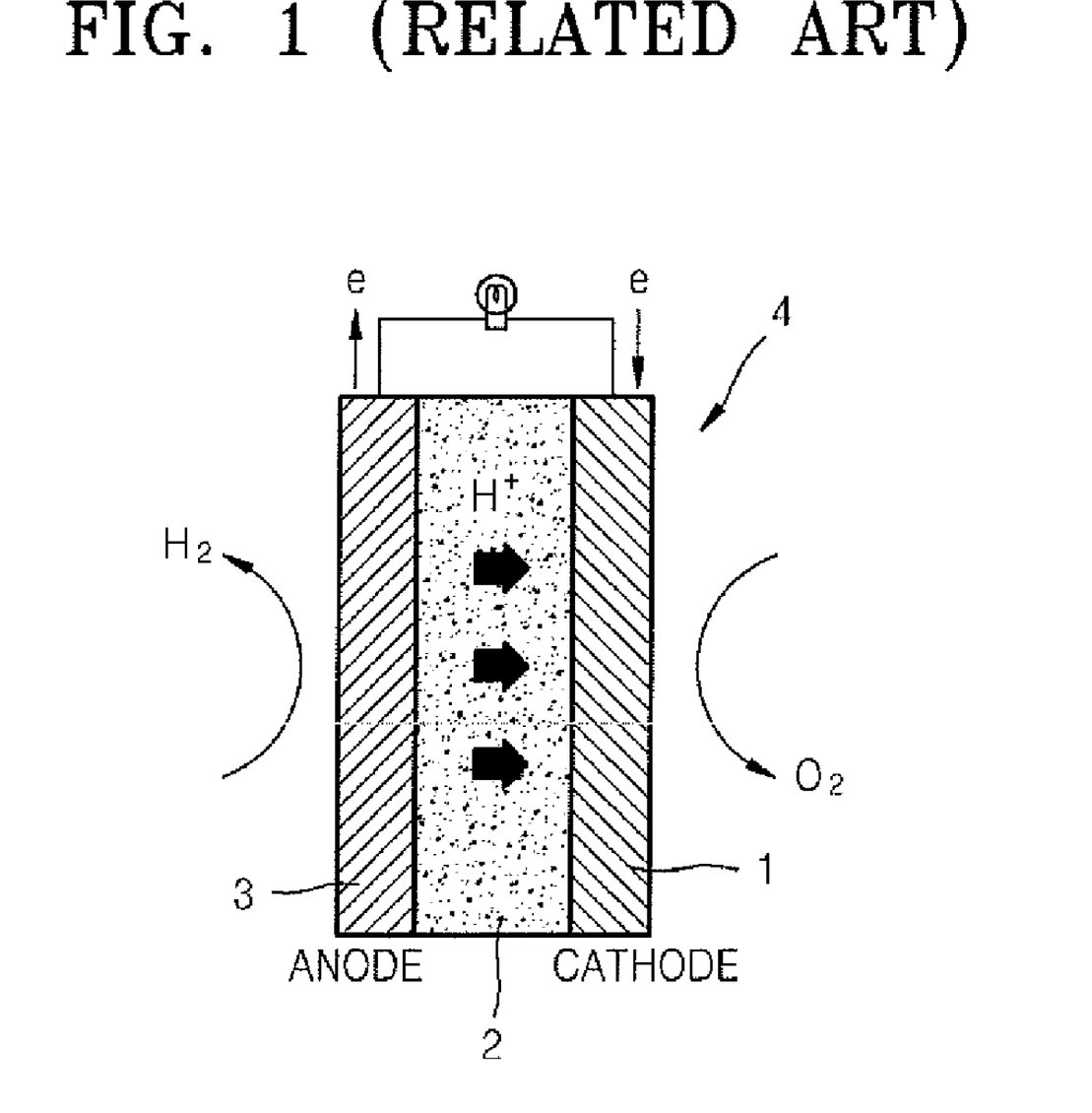
FIG. 1 is a schematic drawing illustrating the related art principle of electricity generation of a conventional fuel cell.

A fuel cell is an electric generator that converts the chemical energy in a fuel into electrical energy through a chemical reaction, and a fuel cell can continuously generate electricity as long as the fuel is supplied. FIG. 1 is a schematic drawing illustrating the energy transformation structure of a fuel cell. Referring to FIG. 1, when air that includes oxygen is supplied to a cathode 1 and a fuel containing hydrogen is supplied to an anode 3, electricity is generated by a reverse electrolysis reaction as water and protons move through an electrolyte membrane 2. However, a unit cell 10 does not generally produce a useful high voltage. Therefore, electricity is generated by a stack 20 (referring to FIG. 2) in which a plurality of unit cells 10 are connected in series.

Figure 2:
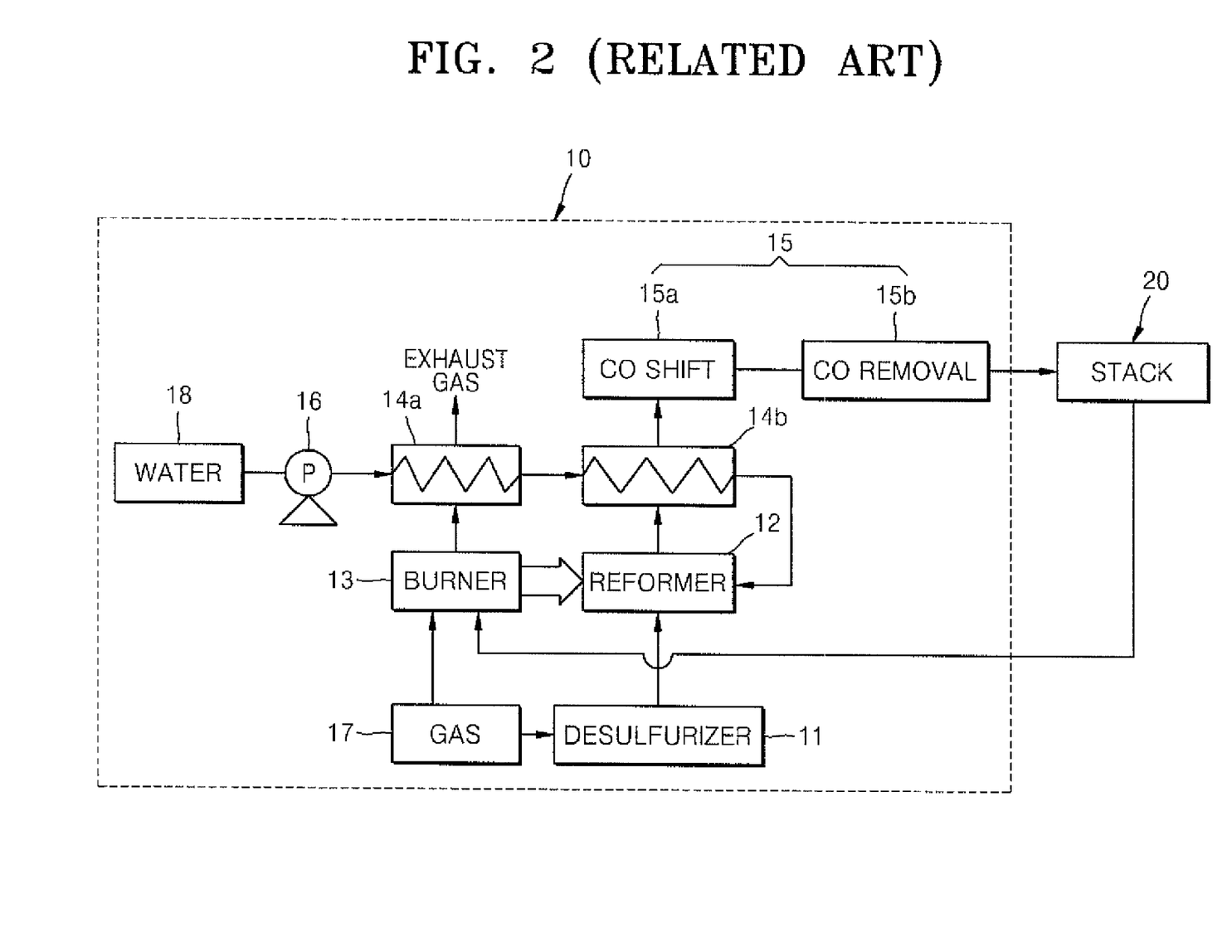
FIG. 2 is a block diagram showing a configuration of a related art fuel processor that processes a fuel that is to be supplied to a fuel cell.

A hydrocarbon group containing material such as a natural gas can be used as a fuel source for supplying hydrogen to the stack 20. Hydrogen is often extracted from a fuel source in a fuel processor 10, as depicted in FIG. 2, in order to supply hydrogen to the stack 20.

The fuel processor 10 includes a desulfurizer 11, a reformer 12, a burner 13, a water supply pump 16, first and second heat exchangers 14a and 14b, and a CO removal unit 15. The CO removal unit 15 consists of a CO shifter 15a and a CO remover 15b. The hydrogen extraction process is performed in the reformer 12. That is, hydrogen is generated in the reformer 12, through a chemical reaction 1 indicated below between a hydrocarbon group containing gas, that acts as the fuel source, entering from a fuel tank 17, and steam entering from a water tank 18, by the action of a water supply pump 16. The reformer 12 is heated by the burner 13.

[Chemical reaction 1]

$$CH_4 + 2H_2O \longrightarrow CO_2 + 4H_2$$

However, at this time, CO and $CO_2$ are generated as byproducts. If a fuel containing CO, at a concentration of 10 ppm or more, is supplied to the stack 20, the electrodes can be poisoned, resulting in greatly reducing the performance of the fuel cell. Therefore, the content of CO in an outlet of the reformer 12 is controlled to be 10 ppm or less, by installing the CO shifter 15a and the CO remover 15b.

A chemical reaction 2 indicated below occurs in the CO shifter 15a and chemical reactions 3, 4, and 5, as indicated below, occur in the CO remover 15b. The CO content in the fuel that has passed through the CO shifter 15a is 5,000 ppm or less and the CO content in the fuel that has passed through the CO remover 15b is 10 ppm or less.

[Chemical reaction 2]

$$CO + H_2O \longrightarrow CO_2 + H_2$$

[Chemical reaction 3]

$$CO + \tfrac{1}{2}O_2 \longrightarrow CO_2$$

[Chemical reaction 4]

$$H_2 + \tfrac{1}{2}O_2 \longrightarrow H_2O$$

[Chemical reaction 5]

$$CO + 3H_2 \longrightarrow CH_4 + H_2O$$

The desulfurizer 11 located at an inlet of the reformer 12 removes sulfur compounds (sulfur) contained in the fuel source. The sulfur compounds are absorbed while passing through the desulfurizer 11, because sulfur is a fuel cell containment. Sulfur can easily poison the electrodes, if the sulfur compounds are present at 10 parts per billion (ppb), or more, when supplied to the stack 20.

When the fuel processor 10 is operating, a fuel source such as a natural gas is supplied to the reformer 12, through the desulfurizer 11, from the fuel tank 17. A portion of the fuel source is used as a fuel for igniting the burner 13. Then steam, from the first and second heat exchangers 14a and 14b, reacts with the desulfurized fuel source in the reformer 12 to generate hydrogen. The hydrogen produced is supplied to the stack 20, after the CO content is reduced to 10 ppm, or less, while passing through the CO shifter 15a, and the CO remover 15b.

Figure 3:
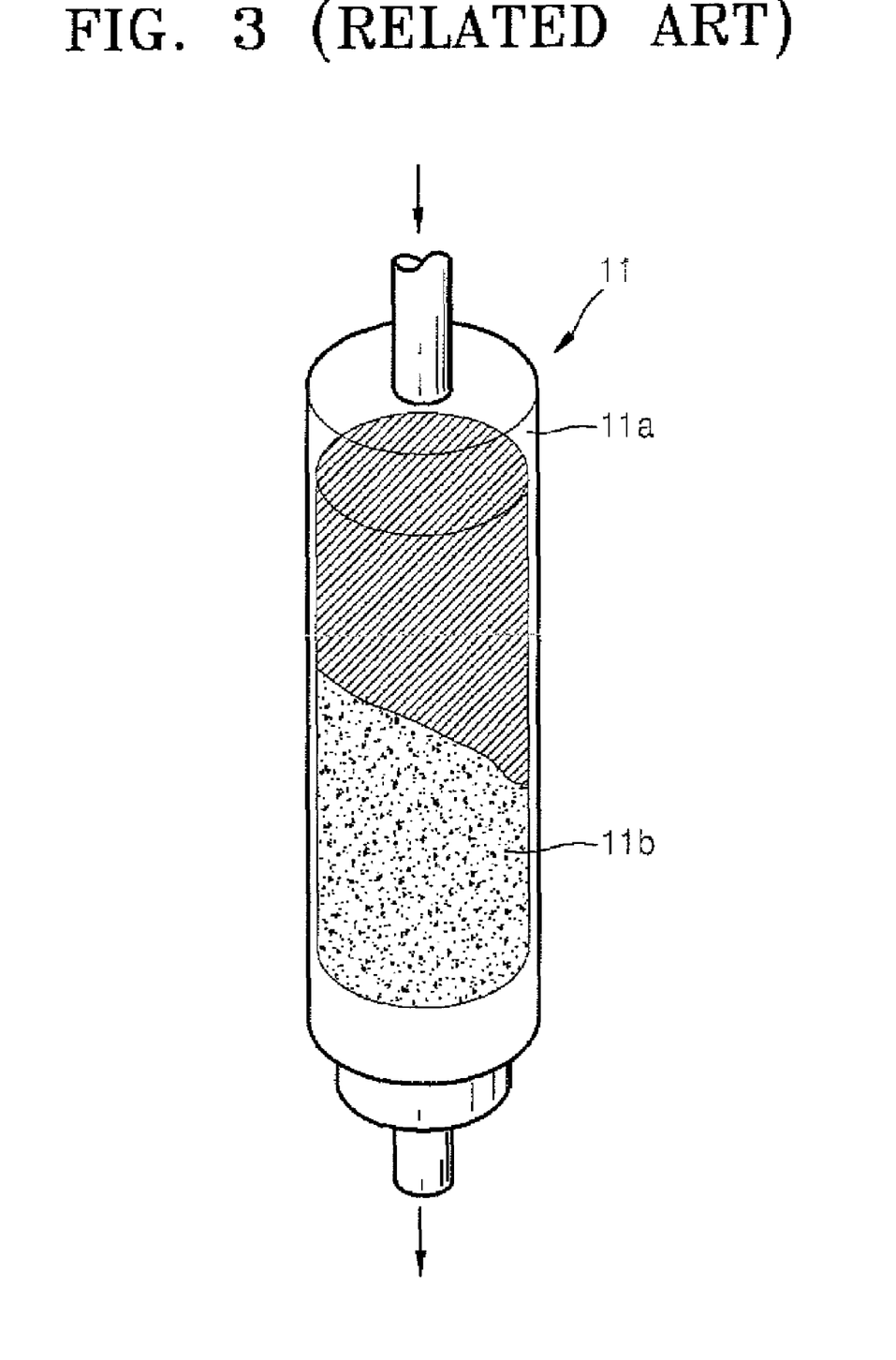
FIG. 3 is a schematic drawing illustrating a structure of a related art desulfurizer employed in the fuel processor illustrated in FIG. 2.

In the related art, as shown in FIG. 3, the desulfurizer 11 has a structure in which an adsorbent 11b of a zeolite material is filled into a transparent housing 11a. In the conventional desulfurizer 11, there is a risk of using the adsorbent 11b after it has exhausted its adsorption capability. In this case, a fuel having a high sulfur content may be supplied to the stack 20. This problem can be solved by directly observing the adsorbent 11b, with the naked eye, through the transparent housing 11a. The observation often takes place whether the adsorbent 11b reaches a saturation state or not. This observation is conducted because the color of the adsorbent portion of the desulfurizer 11 changes when the adsorbent 11b adsorbs sulfur and the time to replace the adsorbent 11b can be determined by observing the change of color of the adsorbent 11b, through the transparent housing 11a. In general, the color gradually changes from the inlet toward the outlet of the fuel source.

However, in the direct observing method, if the replacement time is missed, the adsorbent 11b is still used after the adsorption capability of the adsorbent 11b is exhausted. Therefore, there is a high possibility of supplying a fuel containing a high sulfur content to the stack 20. Also, some adsorbents, like zeolite, change different colors with respect to different sulfur compounds. Therefore, when different kinds of sulfur compounds are adsorbed, an appropriate time to replace cannot be determined.

Figure 4:
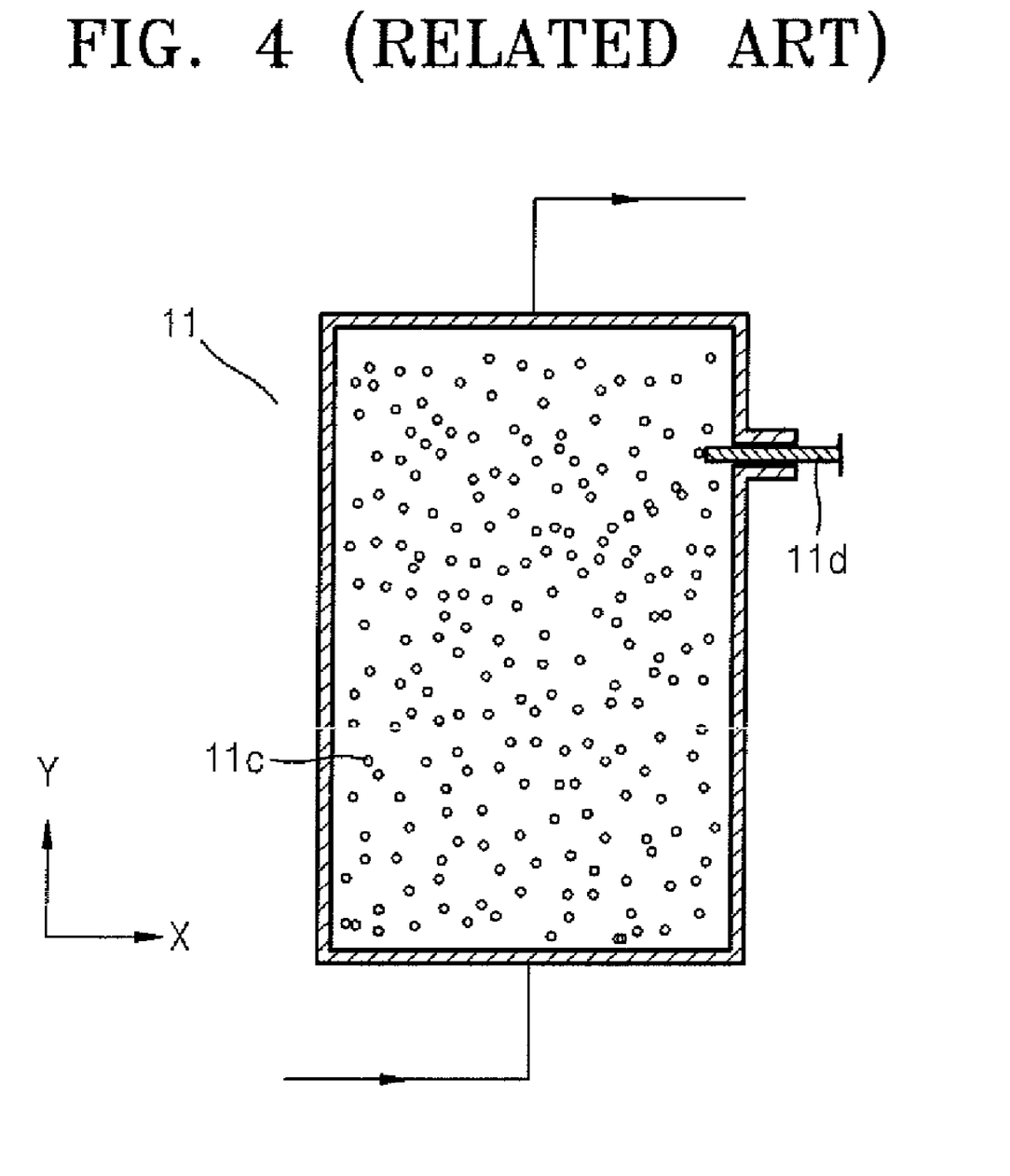
FIG. 4 is a cross-sectional view illustrating another structure of a related art desulfurizer employed in the fuel processor illustrated in FIG. 2.

As depicted in FIG. 4, a method of indicating the time to replace an adsorbent 11c, by measuring the electrical resistance of the adsorbent 11c using a sensor 11d, has been disclosed in Japanese Patent Publication No. 2004-178975.

In this method the sensor 11d, formed of zinc oxide, is installed at an outlet of the adsorbent 11c. When the electrical resistance changes, the sensor 11d issues an alarm signal indicating that it is time to replace the adsorbent 11c. That is, since the adsorption of the sulfur compounds begins at the inlet of the desulfurizer 11, and gradually progresses toward the outlet of the desulfurizer 11, if the resistance of the adsorbent 11c changes, due to the adsorption of sulfur compounds detected by the sensor 11d, the sensor 11d is designed to recognize that the adsorbent 11c is saturated with the sulfur compounds, and to give an alarm to replace the adsorbent 11c.

However, this method assumes that the sulfur compounds are sequentially and gradually adsorbed by the adsorbent 11c, from the inlet towards the outlet of the desulfurizer 11. However, in practice, the adsorption of the adsorbent 11 does not progress gradually. In practice, the degree of adsorption may vary even in the same surface, that is, in the X and Y directions. That is, the adsorbent 11c can be relatively rapidly saturated with the sulfur compounds in portions where the fuel gas can easily pass, thereby causing non-uniform adsorption. Accordingly, if the time to replace the adsorbent 11 is measured using only one sensor 11d, and the sensor 11d gives an alarm to replace the adsorbent 11 when only the portion where the sensor 11d is located becomes saturated with the sulfur compounds, the time to replace may have already passed. Furthermore, since a low sulfur content, such as 10 ppb, must be detected in the desulfurizer 11, the regional adsorption differences greatly reduce measuring reliability.

Accordingly, there is a need to develop a measuring method with high reliability by which a correct time to replace the adsorbent in a desulfurizer can be detected.

SUMMARY OF THE INVENTION

The aspects of present invention provide a fuel processor that allows a desulfurizer to appropriately indicate the time to replace an adsorbent by correctly and accurately measuring the adsorption state of sulfur compounds in the adsorbent, a fuel cell system comprising the fuel processor, and a method of operating the fuel cell system.

According to various aspects of the present invention, there is provided a fuel processor that comprises a desulfurizer in which at least one sulfur sensor is installed at each inlet and outlet of the desulfurizer, in order to determine the sulfur saturation state of an adsorbent, using a signal difference between a signal measured at the inlet and a signal measured at the outlet. Herein, sulfur and sulfur compounds are used interchangeably to indicate elemental sulfur and/or compounds containing sulfur atoms.

The fuel processor may further comprise a reformer that extracts hydrogen gas from a fuel source; a burner that heats the reformer to an appropriate temperature for the hydrogen extracting reaction; and a CO removing unit that removes CO produced during the hydrogen extraction reaction in the reformer.

The sulfur sensor may be installed in the adsorbent in the desulfurizer, or alternately may be installed in an inner space of a housing adjacent to the adsorbent in the desulfurizer.

A plurality of desulfurizers may be provided so as to be alternately used, and the sulfur sensor may be a type of sensor that detects at least one electrical, physical, and chemical characteristic variation.

According to aspects of the present invention, there is provided a method of operating a fuel cell system in which sulfur compounds contained in the fuel source are removed using a desulfurizer and hydrogen gas is extracted from the fuel source in order to supply to a stack, comprising: providing sulfur sensors respectively at an inlet and outlet of the desulfurizer; measuring signal variations according to time between the signals measured in each of the sulfur sensors; and determining the saturation state of an adsorbent in the desulfurizer using the signal variations.

The determining of the saturation of the adsorbent may be made when $$\frac{d|\Delta Y|}{dt} < 0,$$

where dt is the variation of time and $d(|\Delta Y|)$ is the variation of signal difference between the inlet sensor and the outlet sensor.

The method may further comprise controlling the measuring frequency of $\Delta Y$ by controlling the dt.

A plurality of desulfurizers may be provided, and when one of the desulfurizers is determined as saturated with sulfur compounds, the other desulfurizer is operated, and the sulfur sensor may be a type of sensor that detects at least one electrical, physical, and chemical characteristic variation.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 7 through 9B are graphs showing the variation of signals received from first and second sulfur sensors, which are employed by the desulfurizer illustrated in FIG. 6, according to time;

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Aspects of the present invention will now be described more fully with reference to the accompanying drawings in which various embodiments of the invention are shown. Herein, the terms "sulfur" and "sulfur compounds" are used interchangeably.

Figure 5:
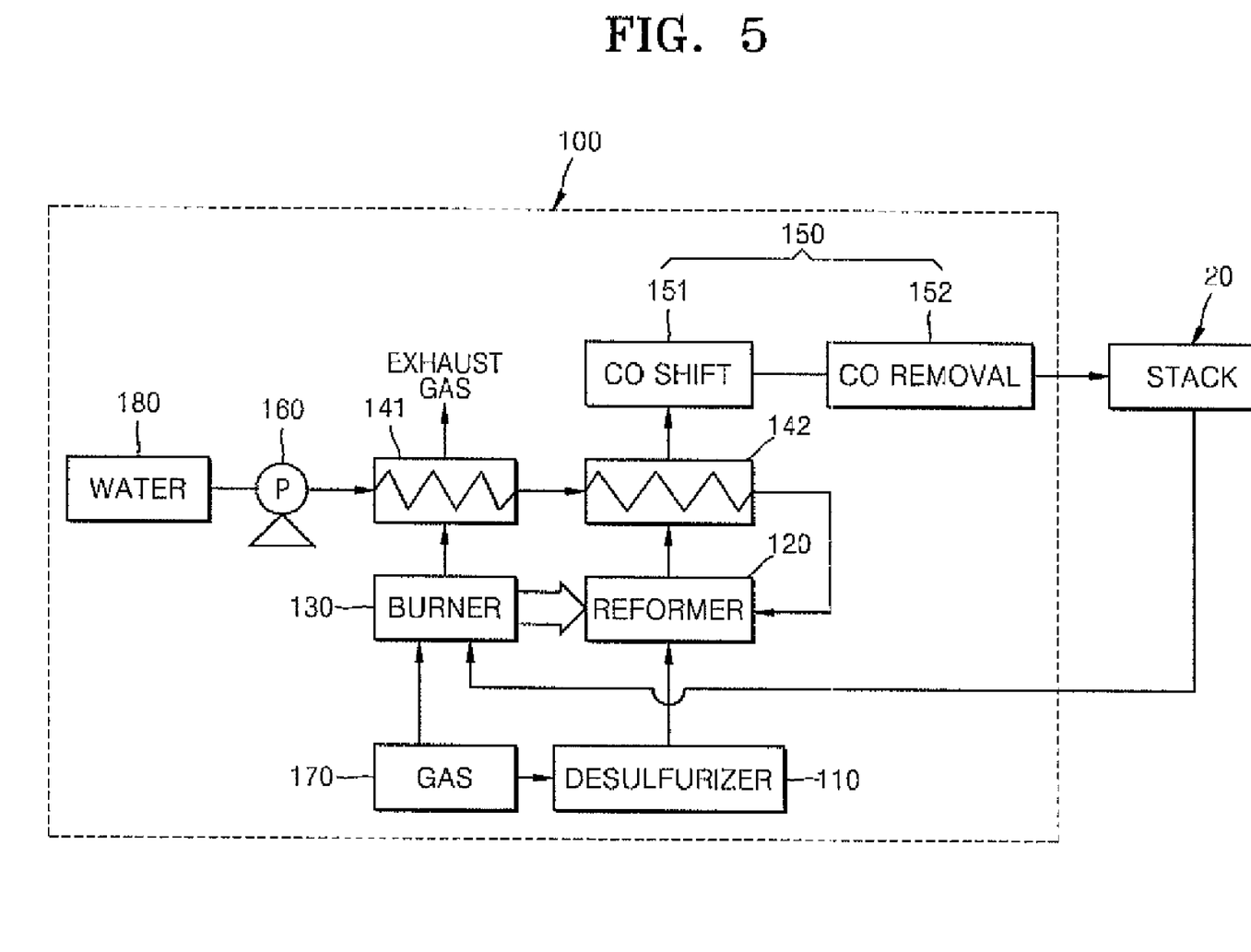
FIG. 5 is a block diagram of a configuration of a fuel processor according to various embodiments of the present invention.

FIG. 5 is a block diagram of a configuration of a fuel processor 100 according to various embodiments of the present invention. The basic structure, like in the related art, comprises a desulfurizer 110, a reformer 120, a burner 130, and a CO removing unit 150 consisting of a CO shifter 151 and a CO remover 152. When a fuel source such as natural gas is supplied from a fuel tank 170, sulfur compounds contained in the fuel source are removed in the desulfurizer 110. Afterward, hydrogen gas that is to be supplied to a stack 20 is extracted from a raw fuel by reacting the raw fuel with steam, in the reformer 120. Water to make the steam can be supplied from a water tank 180, using a pump 160. A CO byproduct from the extraction reaction, is reduced to 10 ppm, or less, in the CO shifter 151 and the CO remover 152. Reference numerals 141 and 142 are first and second heat exchangers for preheating water supplied to the reformer 120.

Figure 6:
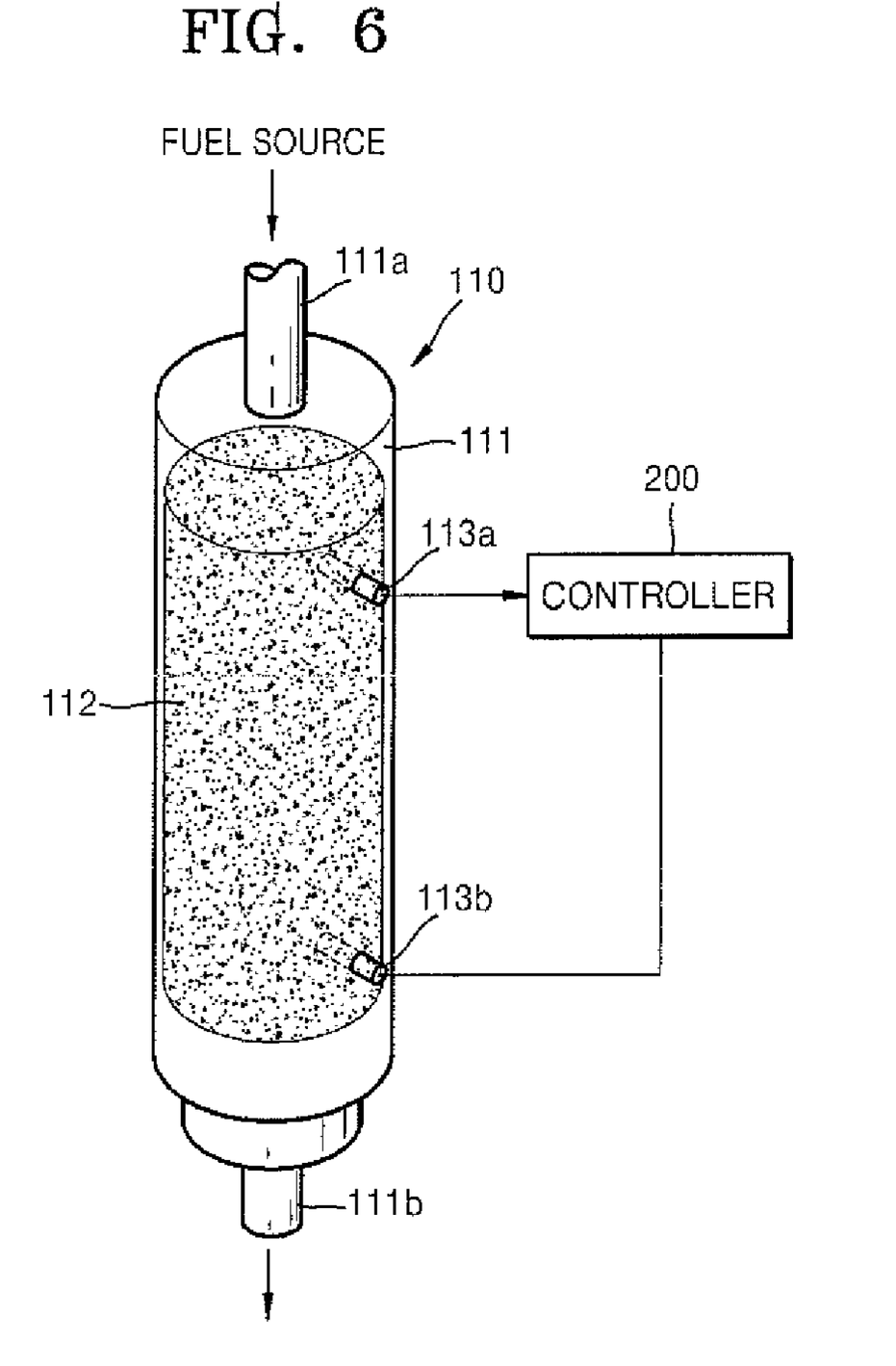
FIG. 6 is a schematic drawing illustrating a structure of a desulfurizer employed by the fuel processor illustrated in FIG. 5, according to various embodiments of the present invention.

FIG. 6 is a schematic drawing illustrating a structure of the desulfurizer 110 comprising an improved sensing mechanism. Referring to FIG. 6, an adsorbent 112, for adsorbing sulfur compounds, is filled in a housing 111, and first and second sulfur sensors 113a and 113b, are respectively installed at an inlet 111a and an outlet 111b, of the desulfurizer 110. The desulfurizer 110 can also comprise a controller to analyze signals from the first and second sulfur sensors 113a and 113b. This configuration allows the sulfur concentration to be measured not at a single point as in the related art, but at two points. In addition, it is within the scope of the present teachings to include additional sulfur sensors positioned in multiple locations along the housing 111. Here, the adsorbent 112 can be any material that can adsorb sulfur compounds, for example, a zeolite or a zinc oxide. The first and second sulfur sensors 113a and 113b can be any type of sensor that can generate different signals in proportion to the variation of the sulfur concentration. The sensors 113a and 113b can measure the variation of sulfur concentration in terms of, for example, electrical resistance, electrical conductivity, ion conductivity, optical extinction, and/or mass. The purpose of the sensing mechanism is to detect the sulfur saturation state of the adsorbent 112 using the signal difference between the first and second sulfur sensors 113a and 113b. The first and second sulfur sensors 113a and 113b can be any sensor as long as the signals of electrical, physical, or chemical characteristics emitted from both the first and second sulfur sensors 113a and 113b are the same, or can be mathematically related.

Figure 7:
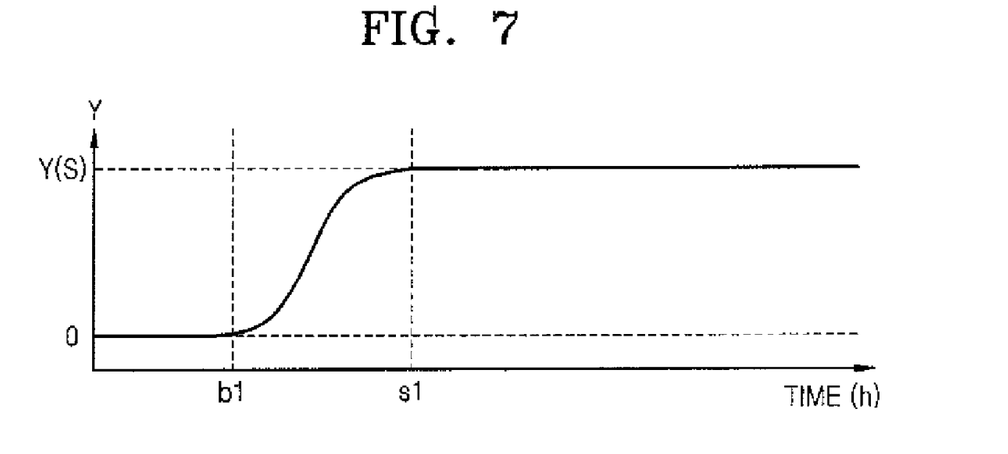

FIG. 7 is a graph showing the variation of a signal over time from the first sulfur sensor 113a. The graph shows that initially, sulfur compounds are not detected due to an adsorbent being installed during time 0 to time b1. The sulfur compound concentration signal is shown to increase from 0, to a maximum saturation level, between times b1 and s1. At time s1, the signal no longer varies, indicating that the adsorbent can no longer absorb any additional sulfur compounds. However, this graph indicates only the sulfur compound saturation at a point where the sulfur sensor 113a is installed. Accordingly, considering that the adsorption of the adsorbent 112 progresses from the inlet 111a toward the outlet 111b of the desulfurizer 110, and considering that the adsorbent 112 filled in the inlet 111a side is saturated with the sulfur compounds, the adsorbent 112 filled in the outlet 111b side usually has adsorption capability.

Figure 8A:
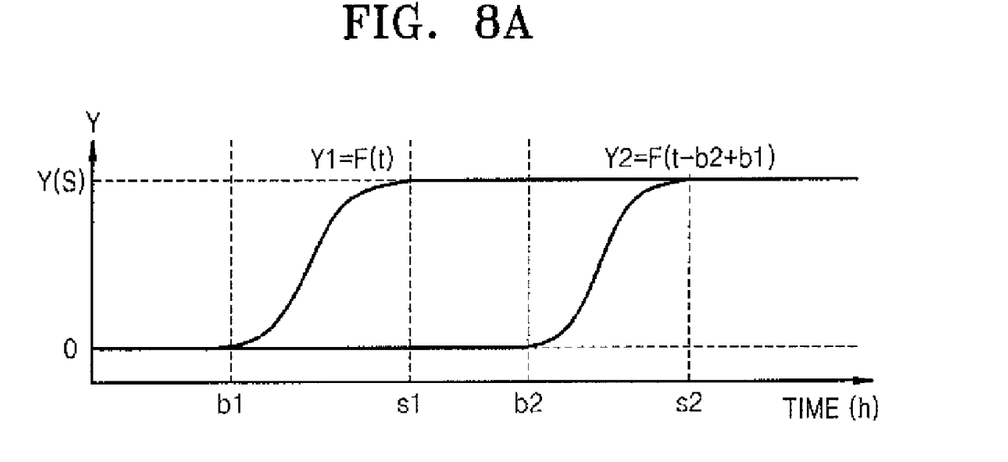

In FIG. 8, Y1 and Y2 show variations of sulfur sensor signals according to time, respectively emitted from the first and second sulfur sensors 113a and 113b. That is, at the beginning, sulfur compounds are not detected by the first and second sulfur sensors 113a and 113b, due to the adsorbent 112 being newly filled during the time 0 to b1. When the adsorbent 112 begins to adsorb the sulfur compounds, the first sensor 113a detects the sulfur compounds and generates a signal corresponding to the amount of sulfur compounds present during the time b1 to s1. Afterwards, the portion of adsorbent 112 at the position where the first sulfur sensor 113a is installed becomes saturated with sulfur compounds by the time s1. However, sulfur compounds are not detected by the second sulfur sensor 113b at this time. This indicates that the portion of the adsorbent 112, at the position where the second sulfur sensor 113b is installed, still has adsorption capability. As the desulfurizing process continues, at the time period between times b2 and s2, the second sulfur sensor 113b begins to detect the sulfur compounds, and generates a signal corresponding to the amount of sulfur compounds present. At the time s2, the adsorbent 112 is shown to be saturated with the sulfur compounds.

The adsorbent 112 may be replaced at the time b2 when the detection of the sulfur compounds begins at sensor 113b, rather than at the time s2, when the adsorbent 112 is determined to be saturated at outlet 111b. The adsorbent 112 can be removed at time s2 to insure that sulfur compounds are not directly fed to the stack 20, due to the adsorption capability of the adsorbent 112 being exceeded. Accordingly, the desulfurizer 110 can be designed so that it gives an alarm to replace the adsorbent 112, at the point when the second sulfur sensor 113b begins to detect the sulfur compounds.

Figure 8B:
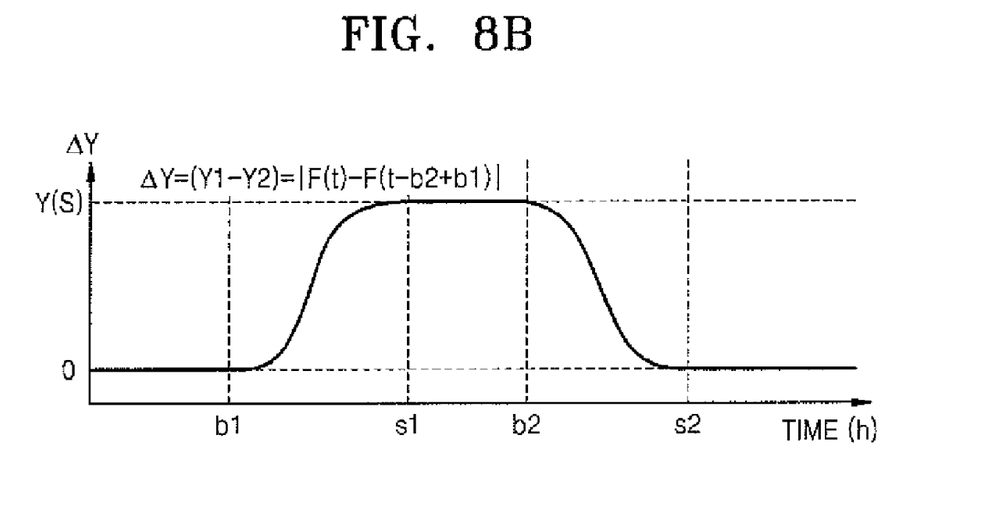

According to some embodiments, b2 represents a time when the slope of the difference of the two graphs becomes negative (−) if the difference |Y1−Y2| between the two graphs is as depicted in FIG. 8B. In the FIG. 8B, ΔY indicates an output signal difference between the first and second sulfur sensors 113a and 113b, the appropriate time b2 to replace the adsorbent 112 can be determined by the equation $$\frac{d|\Delta Y|}{dt} < 0$$

where dt is time variation, and d(|ΔY|) is a signal variation between an inlet side sensor and an outlet side sensor. Accordingly, the differences between the two signals over time are measured in a controller 200 (FIG. 6), by receiving the output signals from the first and second sulfur sensors 113a and 113b. The controller can be a microprocessor or other suitable calculating/processing device. An alarm signal to replace the adsorbent 112 can be given at the point when the slope of the graph changes to a negative (−) value. Then, the user recognizes that it is time to replace the adsorbent 112 due to the alarm, and the desulfurizing process can be continued with a new adsorbent.

According to various embodiments of the present invention, the saturation state of the adsorbent 112 is measured using a signal difference between the plurality of sulfur sensors 113a and 113b respectively installed at the inlet 111a and outlet 111b of the desulfurizer 110, and as a result, the time to replace the adsorbent 112 is determined. Therefore, the accuracy of the determination for replacing the adsorbent 112 is greatly improved as compared to the related art, in which only one sulfur sensor is used. For example, if a slight variation in the sulfur concentration is to be measured using only one sulfur sensor, the sensitivity of the sulfur sensor must be very high. In contrast, when a slight sulfur variation is measured using a difference between two sulfur sensors, the sulfur sensors do not need to be as sensitive to obtain a precise measurement. Also, since the concentration is measured at multiple locations, the possibility of causing a measuring error can be reduced as compared to measuring the concentration at one location. When the sulfur concentration measuring mechanism as described above is employed, a stable and continuous fuel processing operation can be performed since a correct replacing time of the adsorbent 112 can be detected. At this time, the frequency dt of obtaining a ΔY value, by receiving the signals from the first and second sulfur sensors 113a and 113b, can be appropriately controlled as necessary by the controller 200.

Figure 9A:
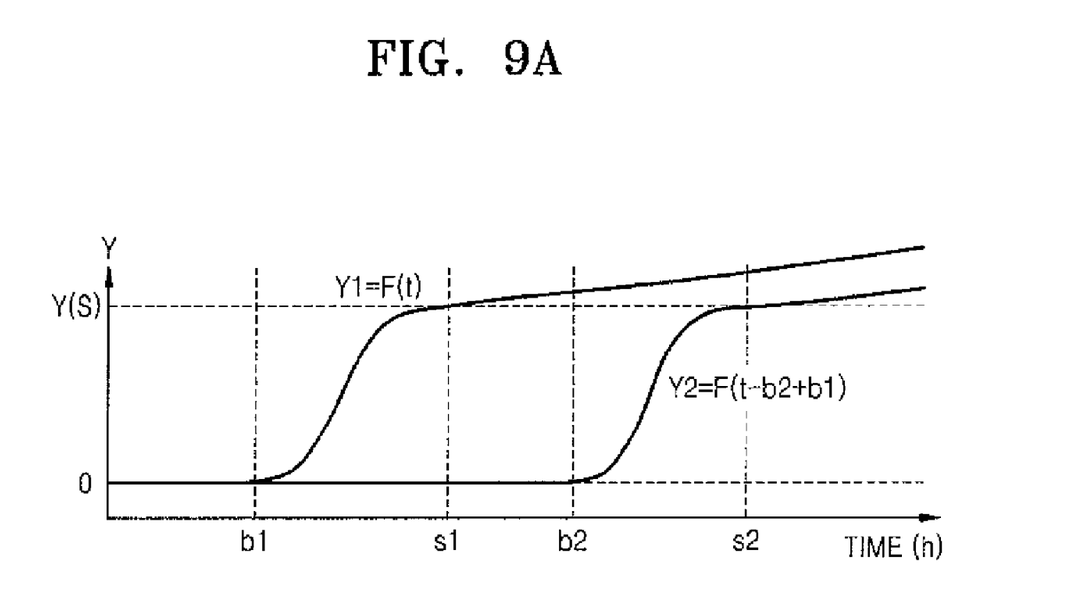
Figure 9B:
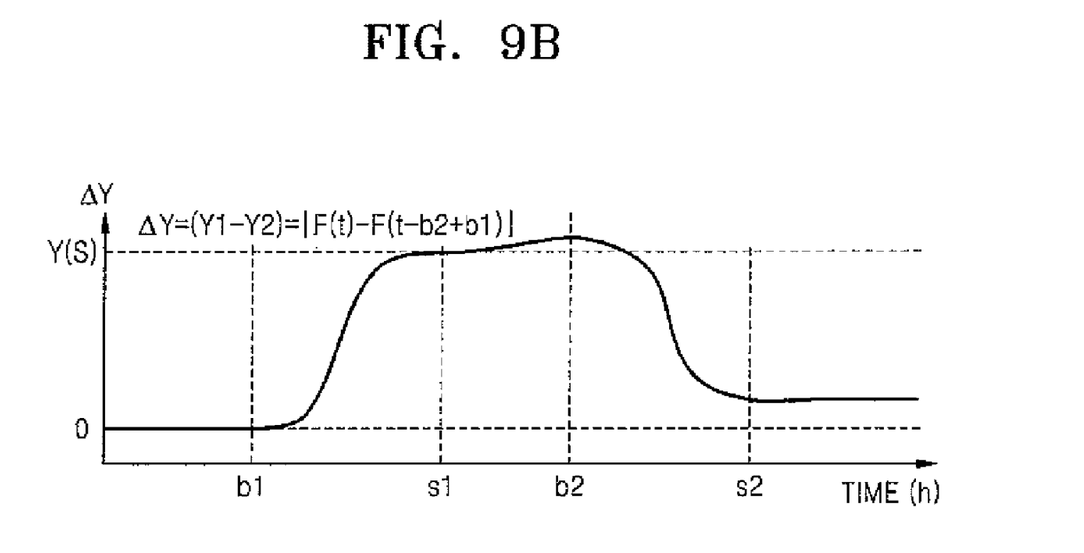

In some cases, as depicted in FIG. 9A, the concentration of sulfur continuously increases at positions where the first and second sulfur sensors 113a and 113b are located, despite the saturation times having passed. In this case, a smoother concentration increasing value is generated prior to reaching complete saturation, after a sudden increase in the sulfur concentration. Also in this case, the replacing time b2 is determined in the same manner as above. That is, the signal difference |ΔY| between the two signals |Y1−Y2| can be as depicted in FIG. 9B. In this case, the b2 point becomes the point when the slope becomes negative (−) as well. Accordingly, the replacing time b2 of the adsorbent 112 can be given in the same manner as above.

Figure 10:
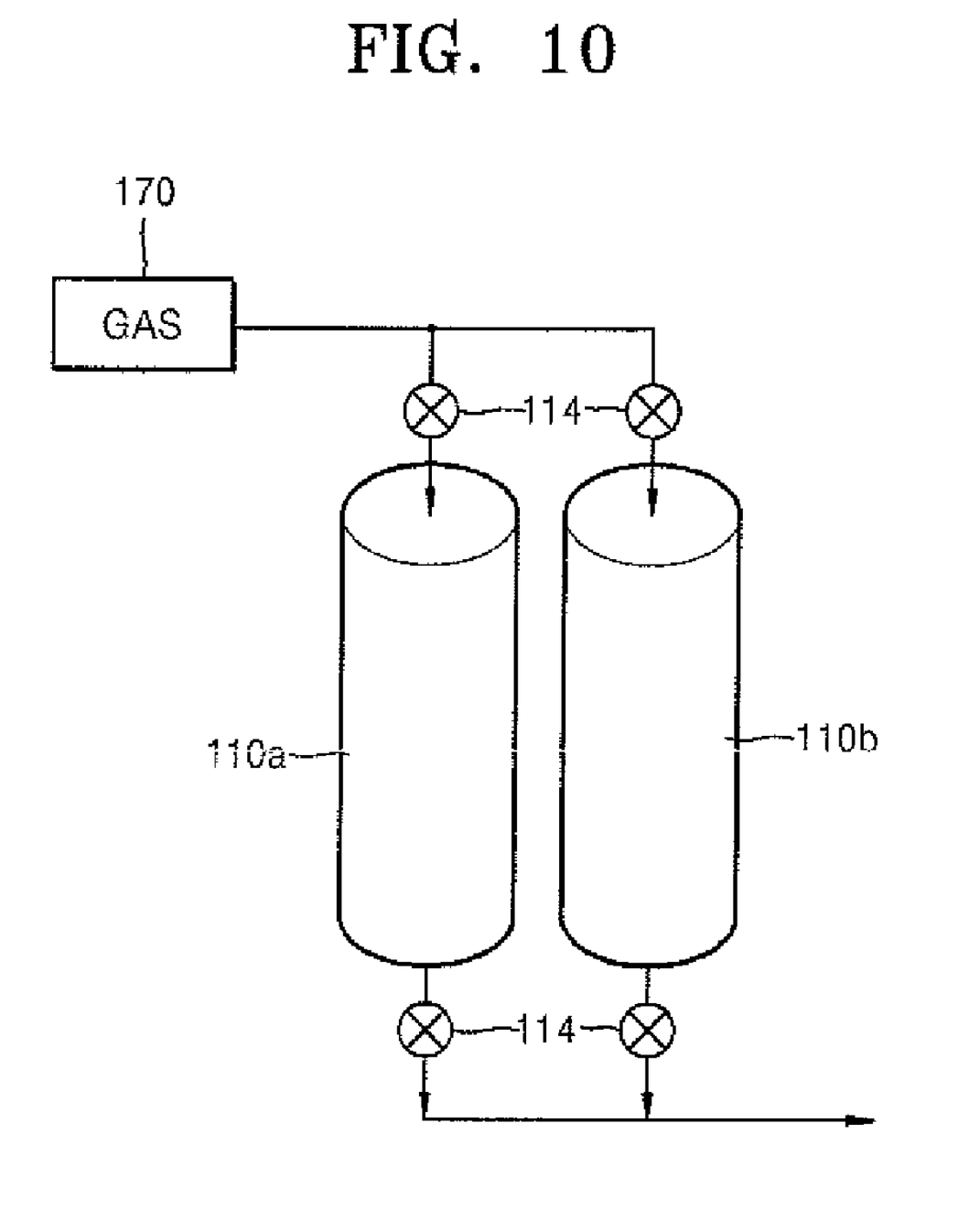
FIG. 10 is a schematic drawing showing an example of the operation of the desulfurizer illustrated in FIG. 6.

When the appropriate time b2 to replace the adsorbent 112 is given, the replacing work can be performed when the desulfurizing operation is stopped. However, as depicted in FIG. 10, multiple desulfurizers 110a and 110b can be provided. For example, if an adsorbent 112 in the desulfurizer 110a needs to be replaced, the adsorbent 112 in the desulfurizer 110a is replaced while the other desulfurizer 110b is in operation. The replacement can be performed either by using valves 114 controlled by the controller 200 or manually. In this manner, a fuel cell can continuously operate without stopping the fuel processing operation while replacing the adsorbent 112.

Figure 11:
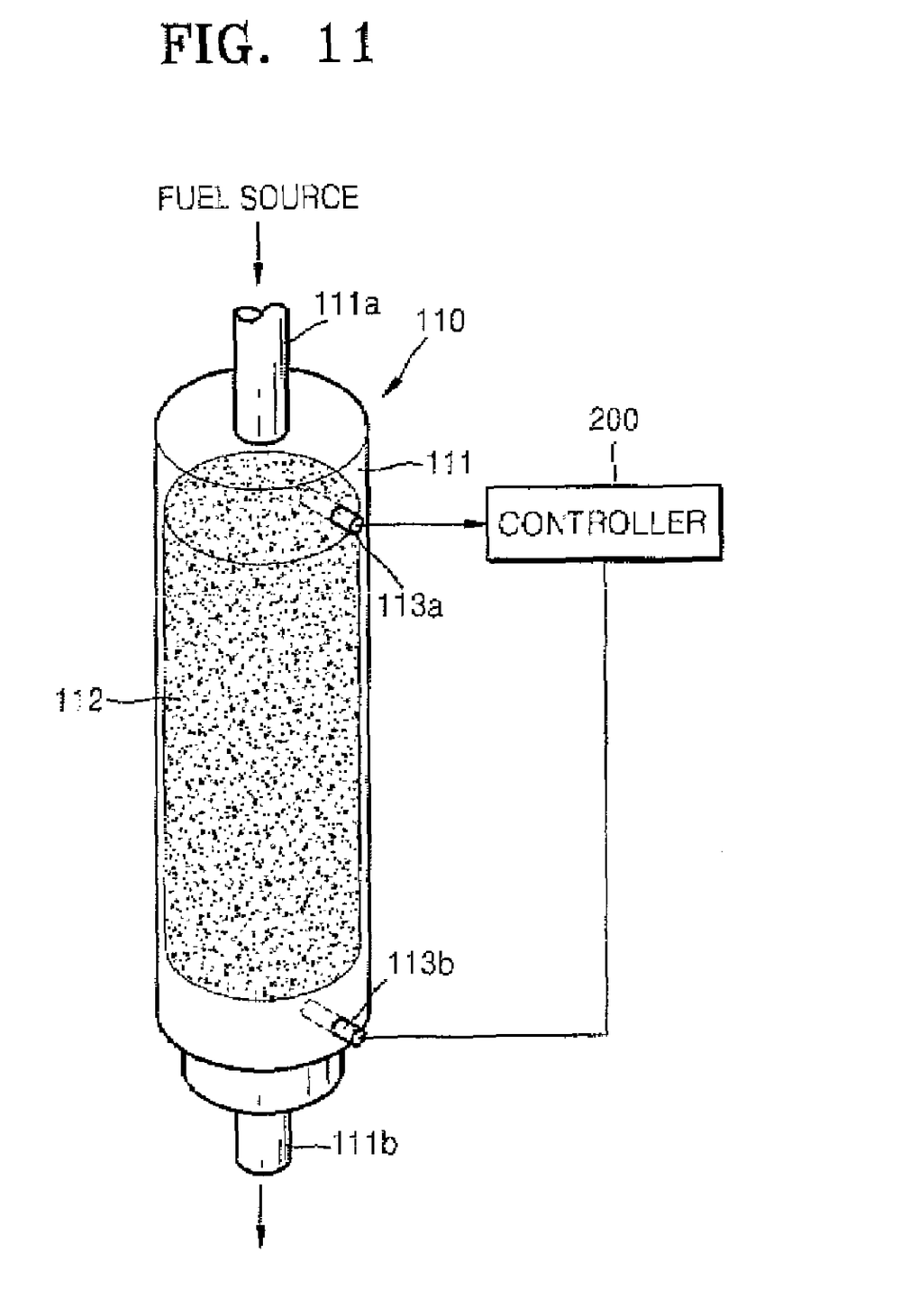
FIG. 11 is a schematic drawing illustrating the installation of a sulfur sensor in an inner space of a housing of the desulfurizer illustrated in FIG. 6.

According to various embodiments, the first and second sulfur sensors 113a and 113b can be installed in the adsorbent 112. In other embodiments and as depicted in FIG. 11, the first and second sulfur sensors 113a and 113b can be installed in an inner space of the housing 111, and detection patterns can be obtained.

As described above, the fuel processor according to the present invention provides the following advantages.

First, since the saturation state of an adsorbent is detected using the variation of signals between sulfur sensors respectively installed at an inlet and an outlet of a desulfurizer and the time to replace the adsorbent is determined using the result of detection, the determination of the time to replace is made more accurately as compared to the related art methods, in which the determination is made using only one sulfur sensor.

Second, since the concentration of sulfur is measured at multiple locations, the possibility of causing a measurement error is reduced as compared to when measurement is performed at only one location, thereby ensuring stable and smooth fuel processing.

Third, the fuel processing can be performed without stopping since multiple desulfurizers can be included in the system and the desulfurizers can be alternately operated.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A fuel processor to purify a fuel using an adsorbent, the fuel processor comprising:
   a desulfurizer comprising a housing having an inlet and an outlet and having the adsorbent disposed in the housing;
   a first sulfur sensor configured to detect at least one of an electrical, a physical, and a chemical characteristic variation of the adsorbent in a first region of the adsorbent and to determine a concentration of sulfur adsorbed on the adsorbent in the first region of the adsorbent, wherein the first region is adjacent to the inlet; and
   a second sulfur sensor configured to detect at least one of an electrical, a physical, and a chemical characteristic variation of the adsorbent in a second region of the adsorbent and to determine a concentration of sulfur adsorbed on the adsorbent in the second region of the adsorbent, wherein the second region is adjacent to the outlet,
   wherein the first sulfur sensor is installed in the first region of the adsorbent and the second sulfur sensor is installed in the second region of the adsorbent.

2. The fuel processor of claim 1, further comprising a second desulfurizer to be used alternately with the desulfurizer.

3. The fuel processor of claim 1, wherein the first and second sulfur sensors determine the saturation state of the respective first and second regions of the adsorbent.

4. The fuel processor of claim 1, further comprising:
   a reformer to extract hydrogen gas from a fuel source;
   a burner to heat the reformer to an appropriate temperature for a hydrogen extracting reaction; and
   a CO removal unit to remove CO produced during the hydrogen extraction reaction.

5. A method of operating a fuel processor in which sulfur contained in a fuel source is removed using a first desulfurizer comprising an adsorbent, the method comprising:
   using a first sulfur sensor and a second sulfur sensor, disposed adjacent to an inlet and an outlet of the first desulfurizer, the first sulfur sensor and the second sulfur sensor being configured to detect at least one of an electrical, a physical, and a chemical characteristic variation of the adsorbent in a first region and a second region of the adsorbent, to produce sulfur concentration signals with respect to a first region of the adsorbent adjacent to the inlet and a second region of the adsorbent adjacent to the outlet, respectively, the first sulfur sensor being installed in the first region of the adsorbent and the second sulfur sensor being installed in the second region of the adsorbent;
   measuring signal variations between the sulfur concentration signals according to time; and
   determining the sulfur saturation state of adsorbent in the first desulfurizer, using the signal variations.

6. The method of claim 5, further comprising producing an alarm when the adsorbent is determined to be saturated with the sulfur.

7. The method of claim 5, further comprising determining saturation of the adsorbent when $$\frac{d|\Delta Y|}{dt} < 0,$$

wherein dt is the variation of time and d(|ΔY|) is the variation of signal difference between the first sulfur sensor and the second sulfur sensor.

8. The method of claim 7, further comprising controlling the measuring frequency of ΔY.

9. The method of claim 5, further comprising ceasing to use the first desulfurizer when an adsorbent of the first desulfurizer is determined to be saturated with sulfur and then operating the fuel processor using a second desulfurizer.

10. The method of claim 5, wherein the first sulfur sensor and the second sulfur sensor determine the saturation state of the respective first and second regions of the adsorbent.

11. A fuel cell system to purify a fuel using an adsorbent, the fuel cell system comprising:
a fuel processor that comprises,
a desulfurizer having an inlet and an outlet and an adsorbent between the inlet and the outlet,
a first sulfur sensor configured to detect at least one of an electrical, a physical, and a chemical characteristic variation of the adsorbent in a first region of the adsorbent and to determine a concentration of sulfur adsorbed on the adsorbent in the first region of the adsorbent, wherein the first region is adjacent to the inlet,
a second sulfur sensor configured to detect at least one of an electrical, a physical, and a chemical characteristic variation of the adsorbent in a second region of the adsorbent and to determine a concentration of sulfur adsorbed on the adsorbent in the second region of the adsorbent, wherein the second region is adjacent to the outlet, wherein the first and second sulfur sensors are to determine the sulfur saturation state of the adsorbent; and
a stack to generate electricity using a fuel supplied from the fuel processor,
wherein the first sulfur sensor is installed in the first region of the adsorbent and the second sulfur sensor is installed in the second region of the adsorbent.

12. A method of operating a fuel cell system in which sulfur contained in a fuel source is removed using a desulfurizer comprising an adsorbent and hydrogen gas is extracted from the fuel source in order to be supplied to a stack, the method comprising:
providing sulfur sensors respectively at an inlet and outlet of the desulfurizer, each sulfur sensor being configured to detect at least one of an electrical, a physical, and a chemical characteristic variation of the adsorbent in a region adjacent to the inlet and in a region adjacent to the outlet, to provide signals corresponding to a sulfur concentration of the adsorbent in the region adjacent to the inlet and a sulfur concentration of the adsorbent in the region adjacent to the outlet, respectively, a first sulfur sensor being installed in the region of the adsorbent adjacent to the inlet and a second sulfur sensor being installed in the region of the adsorbent adjacent to the outlet;
measuring signal variations according to time between the signals measured in each of the sulfur sensors; and
determining the saturation state of an adsorbent in the desulfurizer, using the signal variations.

13. The fuel processor of claim 1, further comprising a controller to determine a saturation state of the adsorbent based on a difference between signals provided by the first and second sulfur sensors corresponding to the sulfur concentration in the first and second regions of the adsorbent, respectively.

14. The fuel processor of claim 1, wherein the adsorbent comprises one of a zeolite and a zinc oxide.

15. The method of claim 9, wherein the ceasing to use the first desulfurizer and operating the fuel processor using a second desulfurizer further comprises:
closing one or more valves connecting the first desulfurizer to the fuel source; and
opening one or more valves connecting the second desulfurizer to the fuel source.

16. The method of claim 9, wherein, the using of the second desulfurizer further comprises maintaining a substantially consistent fuel flow from the fuel source.

17. The fuel cell system of claim 11, further comprising a controller to determine a replacement time for an adsorbent by determining a saturation state of the adsorbent based on a signal difference between the signals measured by the first and second sulfur sensors corresponding to the sulfur concentration in the first and second regions of the adsorbent, respectively.

18. The fuel cell system of claim 17, further comprising a controller to generate an alarm signal based on the saturation states of the adsorbent.

19. A fuel processor comprising:
a fuel source;
a first desulfurizer;
a second desulfurizer; and
a fuel pathway to alternately connect the first and second desulfurizers to the fuel source, wherein the first and second desulfurizers each comprise an inlet and an outlet and an adsorbent between the inlet and the outlet, a first sulfur sensor configured to detect at least one of an electrical, a physical, and a chemical characteristic variation of the adsorbent in a first region of the adsorbent and to determine a sulfur concentration in the first region of the adsorbent, wherein the first region is adjacent to the inlet, and a second sulfur sensor configured to detect at least one of an electrical, a physical, and a chemical characteristic variation of the adsorbent in a second region of the adsorbent and to determine a sulfur concentration in the second region of the adsorbent, wherein the second region is adjacent to the outlet, wherein the first and second sulfur sensors are to determine the sulfur saturation state of an the adsorbent and wherein the first sulfur sensor is installed in the first region of the adsorbent and the second sulfur sensor is installed in the second region of the adsorbent.

20. The fuel processor of claim 1, wherein the first and second sulfur sensors detect at least one of electrical resistance, electrical conductivity, ion conductivity, optical extinction and/or mass of the adsorbent in the respective first and second regions of the adsorbent to determine the concentration of sulfur adsorbed on the respective first and second regions of the adsorbent.

* * * * *